United States Patent [19]

Reinsch

[11] Patent Number: 5,043,823

[45] Date of Patent: Aug. 27, 1991

[54] CATHODE RAY TUBE FOCUS COIL ALIGNMENT AND ASSEMBLY ARRANGEMENT

[75] Inventor: Stephen J. Reinsch, Vista, Calif.

[73] Assignee: Hughes Aircraft Company, Los Angeles, Calif.

[21] Appl. No.: 542,374

[22] Filed: Jun. 22, 1990

[51] Int. Cl.[5] .......... H04N 5/645

[52] U.S. Cl. .......... 358/248; 358/249

[58] Field of Search .......... 358/248–249, 358/229; 335/210, 212, 213; 315/5.35, 397, 399; 313/413, 414, 421, 422, 430–431, 440–442

[56] References Cited

U.S. PATENT DOCUMENTS

| | | | |
|---|---|---|---|
| B 541,517 | 1/1976 | Smith | 335/210 |
| 3,637,930 | 1/1972 | Meier | 335/210 |
| 3,652,966 | 3/1972 | Meier | 335/210 |
| 3,781,730 | 12/1973 | Salners | 335/210 |
| 3,828,287 | 8/1974 | Torsch | 335/210 |
| 3,829,804 | 8/1974 | Alfrich et al. | 335/210 |
| 4,032,872 | 6/1977 | Kratz et al. | 335/212 |
| 4,106,363 | 4/1977 | Deal et al. | 358/248 |
| 4,130,836 | 12/1978 | Kornaker | 358/249 |
| 4,338,584 | 7/1982 | Howard | 358/248 |
| 4,342,049 | 7/1982 | Dickinson | 358/248 |
| 4,353,094 | 10/1982 | Dam | 358/249 |
| 4,360,839 | 11/1982 | Ragland, Jr. et al. | 358/249 |
| 4,431,940 | 2/1984 | Habraken et al. | 313/413 |
| 4,442,417 | 4/1984 | Symons | 315/5.35 |
| 4,484,166 | 11/1984 | Osinga et al. | 313/431 |
| 4,553,120 | 11/1985 | Dam | 335/210 |
| 4,612,524 | 9/1986 | Groothoff | 335/210 |
| 4,638,219 | 1/1987 | Pons | 358/249 |
| 4,673,906 | 6/1987 | Petrow | 335/210 |
| 4,730,144 | 3/1988 | Ingle et al. | 313/413 |
| 4,758,763 | 7/1988 | Gorton | 358/249 |
| 4,786,973 | 11/1988 | Lock et al. | 358/248 |
| 4,874,982 | 10/1989 | Overdijk et al. | 313/440 |

*Primary Examiner*—Stephen Brinich
*Attorney, Agent, or Firm*—Terje Gudmestad; Wanda K. Denson-Low

[57] ABSTRACT

A focus coil (20) is adjustably retained around the neck (12*c*) of a cathode ray tube (12) inside a shield (14). An alignment apparatus (62) includes a ring (64) which is movable with five degrees of freedom and clamps onto the coil (20) through holes (14*j*) formed through the shield (14). The tube (12) and shield (14) are held stationary, while the ring (64) and thereby the coil (20) are moved to align the coil (20) relative to the tube (12) in accordance with electrical alignment test signals applied to the tube (12). A clam shell (66) which is generally coaxially disposed between the shield (14) and ring (64) includes a plurality of arcuate segments (66*a*) which are hinged together at their ends, and have pins (66*b*) extending radially inwardly therefrom for clamping engagement with the coil (20). A screw (70) extends inwardly from the ring (64) to clamp the clam shell (66) between its inner end and a radially opposed portion (72) of the inner surface of the ring (64). A sleeve (40) removably fixes the coil (20) to the neck (12*c*) of the tube (12), and includes a plurality of resilient fingers (56) which are movable into and out of locking engagement with the neck (12*c*). The sleeve (40) is clamped to the neck (12*c*) and, after alignment of the coil (20) to the tube (12), the coil (20) is fixed to the sleeve (40) using an adhesive.

21 Claims, 6 Drawing Sheets

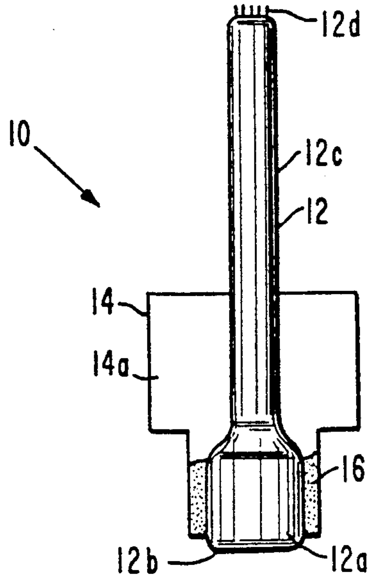
Fig. 1.
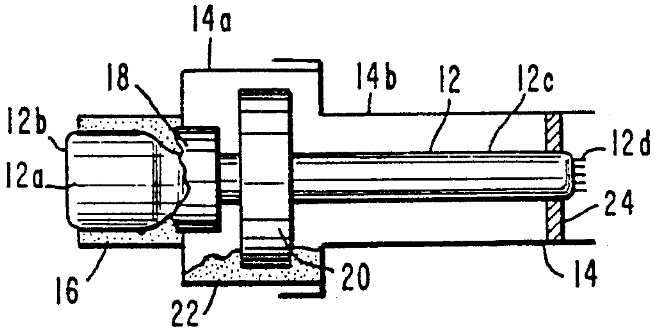
Fig. 2.
Fig. 3.
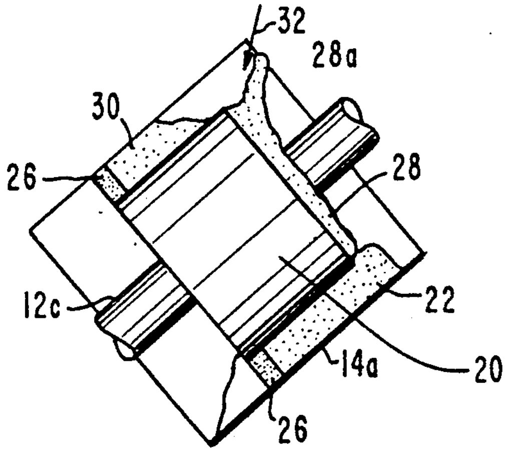
Fig. 4.
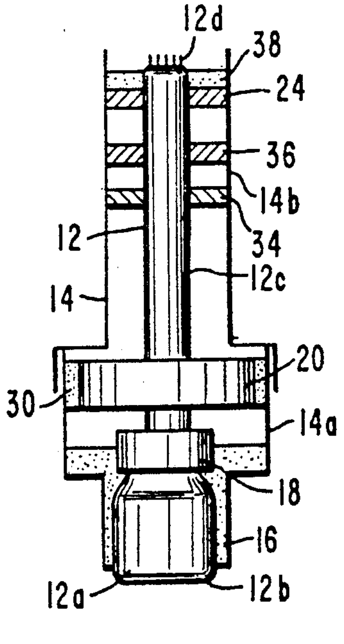

CATHODE RAY TUBE FOCUS COIL ALIGNMENT AND ASSEMBLY ARRANGEMENT

BACKGROUND OF THE INVENTION

1. Field of the Invention

The present invention relates to a method and apparatus for aligning and mounting a focus coil on the neck of a cathode ray tube.

2. Description of the Related Art

A focus coil has conventionally been fixed around the neck of a cathode ray tube after alignment thereof by means of a silicone or RTV (room temperature vulcanizing) rubber adhesive. This leaves the coil, which is relatively heavy, essentially floating in a rubbery mounting. The weight of the coil enables it to shift position relative to the cathode ray tube, and thereby move out of electrical alignment with the tube. Where the rubber adhesive is formed around the coil and tube assembly, it makes the coil overheat and causes the focus to drift.

Another disadvantage of the conventional mounting method is that the focus coil cannot be aligned to the tube with the coil and tube enclosed in a protective metal shield. If the coil alignment is performed with the shield removed, the alignment may be affected by external electric or magnetic fields. In addition, where the shield is made of a conductive metal, it may be electromagnetically coupled to the coil. Thus, the alignment may be different with and without the shield in place. If the coil is aligned with the shield removed, the alignment may be incorrect when the shield is subsequently attached.

The conventional coil mounting method does not allow the focus coil to be removed from the cathode ray tube for maintenance purposes. A number of arrangements have been devised for mounting deflection coils on cathode ray tubes using removable sleeves. A typical example is disclosed in U.S. Pat. No. 3,781,730, entitled "YOKE MOUNTING RING WITH DEFORMABLE FINGER MEMBERS", issued Dec. 25, 1973, to Edward Salners. This patent teaches how to provide a ring mounting device for receiving a deflection yoke, including a plurality of fingers extending therefrom for physical attachment to the bell portion of a cathode ray tube, such as by an adhesive tape or the like. However, the mounting configuration for a deflection coil is different from that of a focus coil, since a deflection coil is disposed around the large, bell shaped portion of a cathode ray tube rather than the neck thereof. Thus, prior art arrangements for mounting deflection coils are generally unsuitable for focus coils. In addition, they do not enable adjustment about multiple axes.

SUMMARY OF THE INVENTION

The present invention provides a method and apparatus for adjusting and fixing a focus coil or other applicable electron beam controlling coil or permanent magnets around the neck of a cathode ray tube. The invention allows the coil to be mounted rigidly, but be capable of easy removal for maintenance. The invention further enables the coil to be aligned and fixed in place on the coil while it is inside a protective metal shield. This enables the alignment to be performed with extreme precision and accuracy, and provides a sharpness of focus which has been heretofore unobtainable.

More specifically, a focus coil is adjustably retained around the neck of a cathode ray tube inside a shield. An alignment apparatus includes a ring which is movable with five degrees of freedom and clamps onto the coil through holes formed through the shield. The tube and shield are held stationary, while the ring and thereby the coil are moved to align the coil relative to the tube in accordance with electrical alignment test signals applied to the tube. A clam shell which is generally coaxially disposed between the shield and ring includes a plurality of arcuate segments which are hinged together at their ends, and have pins extending radially inwardly therefrom for clamping engagement with the coil. A screw extends inwardly from the ring to clamp the clam shell between its inner end and a radially opposed portion of the inner surface of the ring. A sleeve removably fixes the coil to the neck of the tube, and includes a plurality of resilient fingers which are movable into and out of locking engagement with the neck. The sleeve is clamped to the neck and, after alignment of the coil to the tube, the coil is fixed to the sleeve using an adhesive.

These and other features and advantages of the present invention will be apparent to those skilled in the art from the following detailed description, taken together with the accompanying drawings, in which like reference numerals refer to like parts.

DESCRIPTION OF THE DRAWINGS

FIGS. 1 to 4 are simplified diagrams illustrating a cathode ray tube focus coil alignment, assembly, and potting method embodying the present invention;

DETAILED DESCRIPTION OF THE INVENTION

Figure 5:
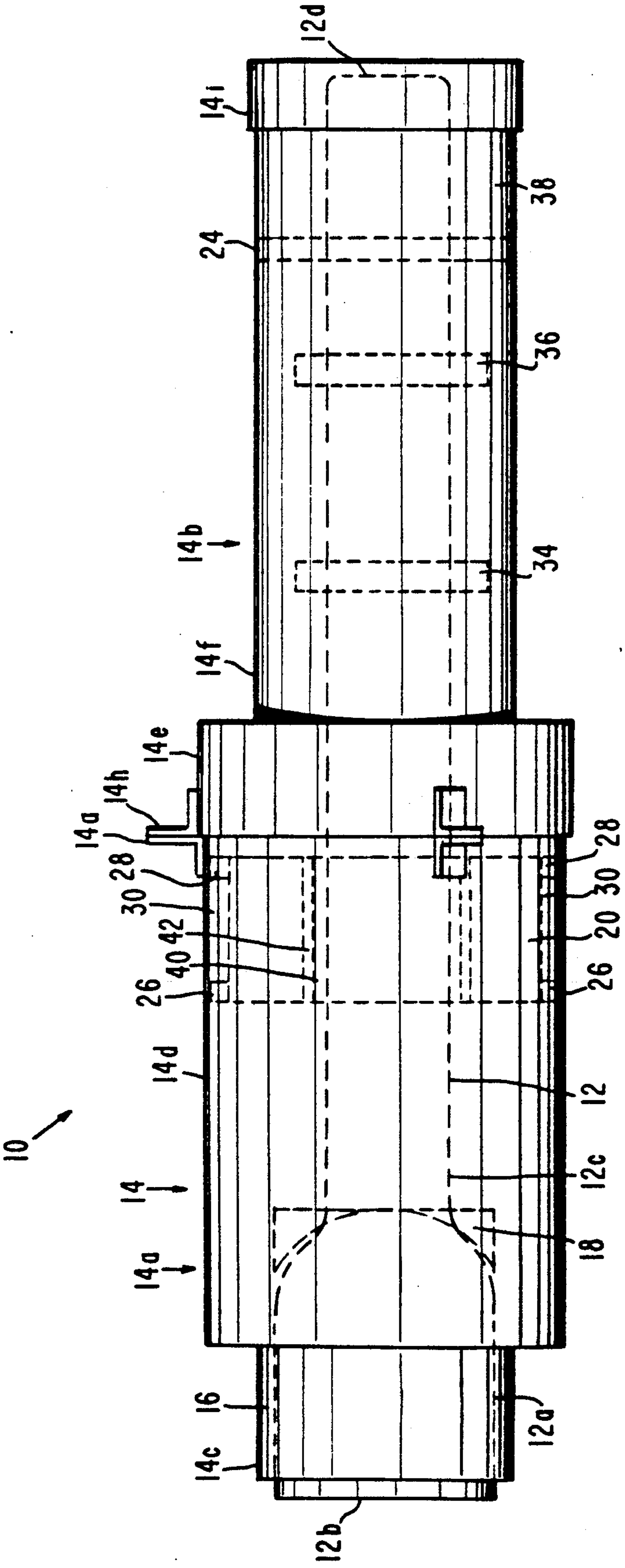
FIG. 5 is a side elevation of a cathode ray tube and focus coil arrangement, illustrating internal components in broken line.

Referring now to FIGS. 1 to 4 of the drawing, a cathode ray tube assembly embodying the present invention is generally designated as 10, and includes a cathode ray tube 12 having an enlarged bell section 12*a* which terminates in a face or viewing screen 12*b*, and a neck 12*c* which terminates in an electrical connector 12*d*. In accordance with the method of the present invention, the tube 12 is stood vertically on its face 12*b* as viewed in FIG. 1, and a front section 14*a* of a protective shield 14 is positioned around the bell section 12*a* and an adjacent portion of the neck 12*c*. The shield 14 is preferably made of a special steel known as "mu-metal" that has special magnetic field attenuating properties. Alternatively, the shield 14 may be made of an electrically conductive metal such as aluminum, steel, or the like, or a material which is not electrically conductive.

With the tube 12 and front section 14a held in the position illustrated in FIG. 1, a resilient adhesive 16 such as silicone rubber or RTV is poured into a space provided between the outer surface of the bell section 12a and the inner surface of the front shield section 14a. The adhesive 16 firmly but resiliently attaches the front section 14a to the tube 12 so that they form an integral assembly for purposes of handling.

In the next step of the method as illustrated in FIG. 2, the assembly 10 is oriented horizontally, and a deflection coil or yoke 18 and a focus coil 20 are fixed in place on the neck 12c of the tube 12. The deflection coil 18 extends from the neck 12c over part of the bell section 12a of the tube 12, and is fixed thereto using any suitable means which are not the particular subject matter of the invention. The focus coil 20 is aligned with and fixed to the neck 12c in accordance with the method of the present invention, as will be described in detail below. During this latter procedure, a rear section 14b of the shield 14 which encloses the rear portion of the neck 12c is attached to the front section 14a. Alternatively, the alignment and mounting of the focus coil 20 may be performed with the rear section 14b detached, and the rear section 14b attached after the procedure is completed.

As further illustrated in FIG. 2, an adhesive 22 such as silicon rubber or RTV may be poured into the lower portion of the shield 14 as illustrated to support the relatively heavy focus coil 20 during subsequent handling. Also shown in FIG. 2 is a section of foam rubber or weatherstripping 24 which is applied around the rear end portion of the neck 12c spaced inwardly from the rear end of the section 14b.

In FIG. 3, a piece of foam rubber or weatherstripping 26 in the form of a ring is applied around periphery of the front end of the focus coil 20. Another ring of foam rubber or weatherstripping, or alternatively a mass of potting clay 28, is applied around the rear end of the focus coil 20. It is also possible to apply the weatherstripping 26 and 28 before the coil 20 is installed in the shield 14. Where potting clay is used rather than weatherstripping at 28, the clay may be formed into a funnel 28a. The assembly 10 is held at a convenient angle, such as 45°, and silicone rubber or RTV adhesive 30 is poured into a space provided between the outer surface of the focus coil 20 and the inner surface of the front shield section 14a as indicated by an arrow 32 using the funnel 28a as a guide. The rear section 14b may be detached during the process, in which case the adhesive 30 is poured in through the rear end of the front section 14a. Where the rear section 14b is attached during the process, the adhesive 30 is poured in through holes (not shown) formed through the shield 14. It is also possible to inject the RTV with or without the rear section 14b attached through a hole (not shown) in the weatherstripping 26 or 28, or through a hole in the front section 14a.

An advantage of the present arrangement is that the front and rear ends of the focus coil 20 are uncovered, enabling much more efficient dissipation of heat than in the prior art in which the focus coil is covered with RTV.

As shown in FIG. 4, the adhesive 30 fixes the focus coil 20 to the shield 14 for support thereby. Further illustrated in FIG. 4 are a stigmator coil 34 and a beam centering magnet assembly 36 which are assembled on the neck 12c using a suitable means, which may or may not include a smaller version of the invention. The rear shield section 14b is attached to the front section 14a if it has not already been attached, and silicone rubber or RTV adhesive 38 is poured into the rear end of the shield 14 to support the portion of the neck 12c of the tube 12 which extends rearward of the weatherstripping 24. The assembly 10 constitutes a sturdy integral unit, with the cathode ray tube 12 and focus coil 20 rigidly bonded together but held firmly and resiliently inside the shield 14 by the adhesive 16, 30, and 38.

The assembly 10 is shown to enlarged scale in FIG. 5. As will be described in detail below, the focus coil 20 is removably mounted on the neck 12c by a locking cylinder assembly or sleeve 40 which clamps onto the neck 12c, and an adhesive 42 such as epoxy or other rigid setting adhesive which is injected into a radial space provided between the sleeve 40 and the inner surface of the focus coil 20. As is visible in FIG. 5, the front shield section 14a has a small diameter portion 14c which encloses the bell section 12a of the tube 12, and a large diameter rear portion 14d which encloses the focus coil 20. The rear section 14b of the shield 14 includes a large diameter front portion 14e which mates with the rear portion 14d of the front section 14a, and a small diameter rear portion 14f which encloses the coils 34 and 36. Front and rear flanges 14g and 14h are provided for fastening the front and rear sections 14a and 14b together respectively by means of bolts or the like (not shown). The rear end portion of the rear section 14b may be reinforced by a stiffening ring 14i.

Figure 6:
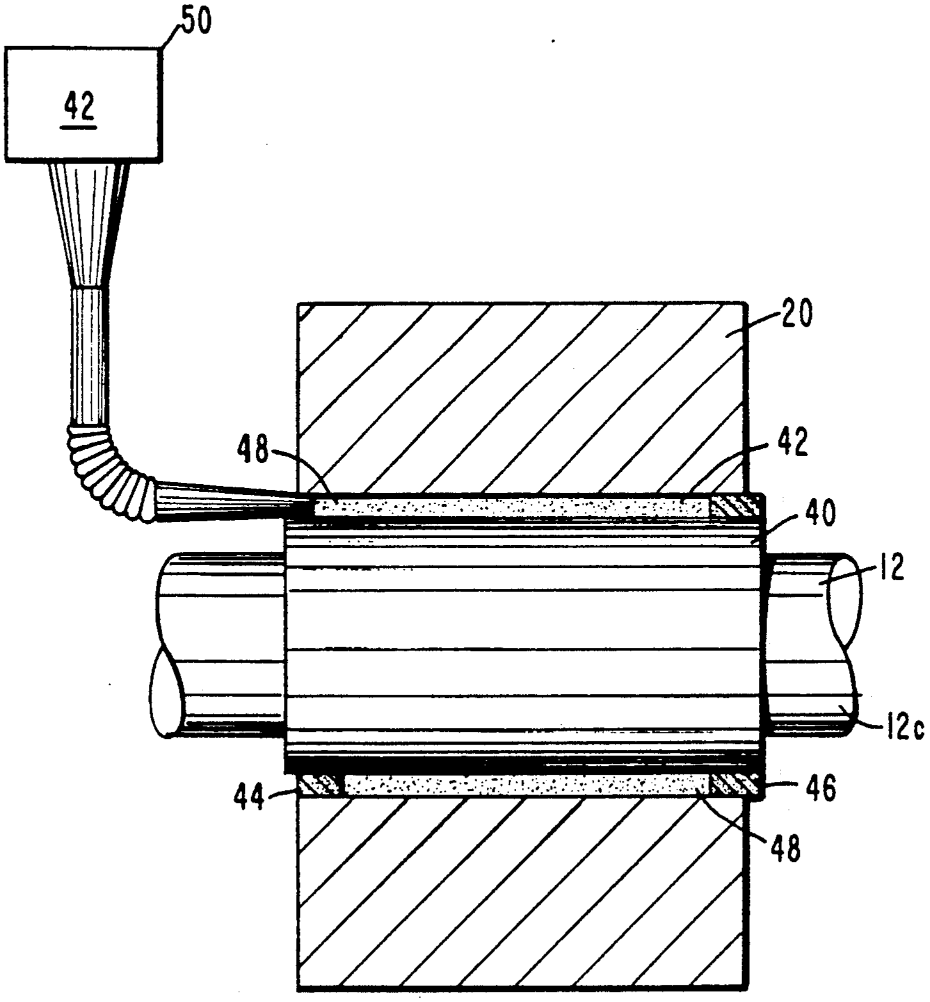
FIG. 6 is a sectional view illustrating a coil mounting sleeve and method of fixing a focus coil thereto in accordance with the invention.

FIG. 6 illustrates how the focus coil 20 is removably attached to the neck 12c of the cathode ray tube 12 by means of the sleeve 40 and adhesive 42. Pieces of foam rubber or weatherstripping 44 and 46 are applied to seal the left and right ends of a radial space 48 provided between the sleeve 40 and focus coil 20. After the focus coil 20 is aligned with the tube 12, the adhesive 42 is injected into the space 48 from a suitable applicator 50, thereby permanently fixing the focus coil 20 to the sleeve 40. However, the sleeve 40 may be released and removed from the neck 12c, making it possible to remove the focus coil 20 which is fixed thereto from the tube 12.

Figure 7:
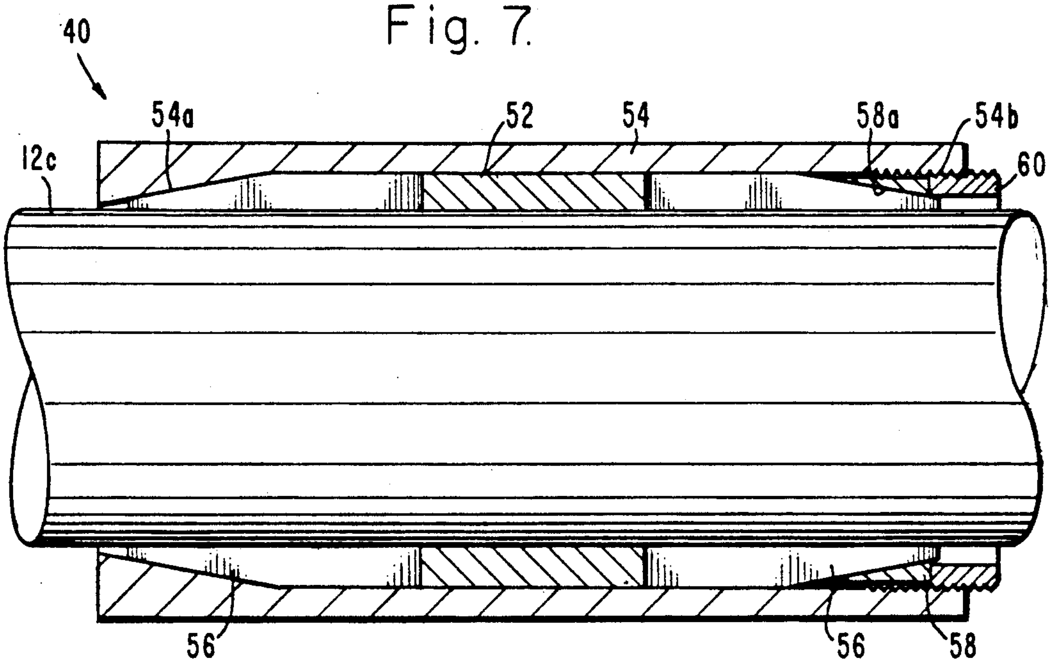
FIG. 7 is an enlarged sectional view of the sleeve illustrated in FIG. 6.
Figure 8:
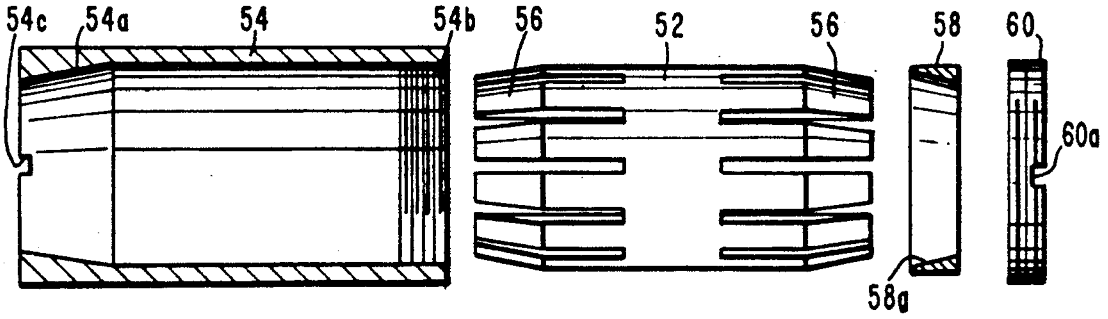
FIG. 8 is an exploded view of the present sleeve.

As shown to enlarged scale in FIGS. 7 and 8, the sleeve 40 includes an inner sleeve member or compression sleeve 52 having an inner diameter substantially equal to the outer diameter of the neck 12c, and an outer sleeve member or compression cylinder 54 which slidingly fits over the compression sleeve 52. The compression sleeve 52 is formed at its ends with a plurality of locking members in the form of tapered, resilient fingers 56, which may be bent inwardly into engagement with the neck 12c to lock the compression sleeve 52 thereto. A left end portion 54a of the inner surface of the compression cylinder 54 is formed with a taper which is conjugate to the taper of the fingers 56 at the left end portion of the compression sleeve 52. A tapered ring 58 slidingly fits inside the compression cylinder 54, and has an inner surface 58a formed with a taper which is essentially similar to the taper of the end portion 54a of the cylinder 54, but faces in the opposite direction and is conjugate to the taper of the fingers 56 at the right end portion of the sleeve 52. A threaded tightening ring 60 may be screwed into and out of a threaded right end portion 54b of the cylinder 54.

The sleeve 40 is assembled by sliding the compression sleeve 52 into the compression cylinder 54, inserting the tapered ring 58, and screwing the tightening ring 60 loosely into the end portion 54b. The sleeve 40 is then slid onto the neck 12*c* to a predetermined position thereon, and the tightening ring 60 screwed tightly into the cylinder 54. Attachment and removal of the sleeve 40 may be facilitated by providing radial slots 54*c* and 60*a* in the oppositely facing ends of the compression cylinder 54 and tightening ring 60 respectively for engagement by spanner wrenches (not shown).

Screwing the ring 60 leftwardly as viewed in FIGS. 7 and 8 into the cylinder 54 causes the cylinder 54 to move rightwardly relative to the sleeve 52, which in turn causes the tapered end portion 54*a* to engage the fingers 56 at the left end portion of the sleeve 52, and move them inwardly into locking engagement with the neck 12*c*. Screwing the ring 60 into the cylinder 54 also causes the ring 58 to move leftwardly relative to the sleeve 52, the tapered inner surface 58*a* of which engages with the fingers 56 at the right end portion of the sleeve 52 and moves them inwardly into locking engagement with the neck 12*c*. If it is desired to remove the focus coil 20 and sleeve 40 assembly from the tube 12 for maintenance subsequent to assembly, screwing the ring 60 out of the cylinder 54 causes the tapered portions of the cylinder 54 and ring 58 to disengage from the fingers 56, and allow them to spring outwardly to their unbent positions away from locking engagement with the neck 12*c*.

If desired, the outer surface of the neck 12*c* at the predetermined position on which the focus coil 20 is to be mounted may be painted, or roughened by etching or the like to facilitate gripping thereof by the fingers 56. A preferred material for the components of the sleeve 40 is an acetal-resin plastic material manufactured by the Dupont company under the tradename "Delrin". However, aluminum, or any other suitable material may be used. The material used for the compression sleeve 52 is selected such that the fingers 56 are sufficiently stiff to retain their positions if epoxy is injected around them, but sufficiently resilient to allow them to conform to the contour of the neck 12*c*. Delrin is preferred because of its slightly resilient property. However, the amount of resiliency is so slight that it will not affect the alignment.

Figure 9:
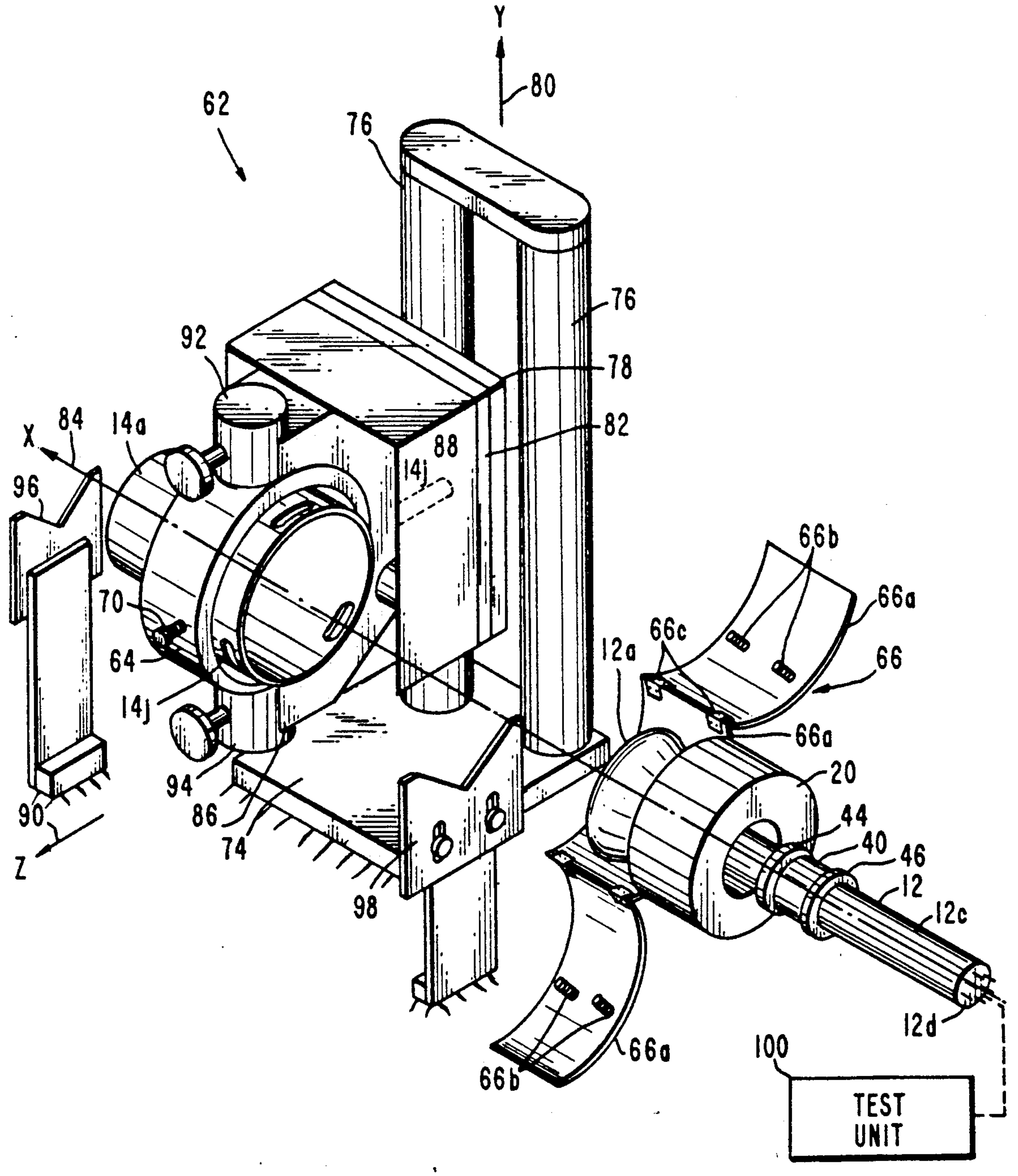
FIG. 9 is a partially exploded perspective view of the present cathode ray tube and focus coil arrangement, and a positioning fixture used to align the coil to the tube.

The alignment and attachment of the focus coil 20 to the neck 12*c* of the cathode ray tube 12 as mentioned above with reference to FIG. 2 will now be described in detail. As shown in FIG. 9, a commercially available positioning fixture or positioner 62, such as Model 740 manufactured by the Newport Research Company of Fountain Valley, CA, is used to adjustably retain the focus coil 20 inside the front shield section 14*a* while aligning the orientation of the coil 20 relative to the tube 12 in accordance with a predetermined electrical alignment procedure. This particular positioner 62 is capable of accurately adjusting the orientation of the coil 20 with five degrees of freedom, although the invention may be practiced using alignment with less than five, or six degrees of freedom. More specifically, the positioner 62 enables precise adjustable movement in translation along three axes, and rotation about two axes.

Figure 10:
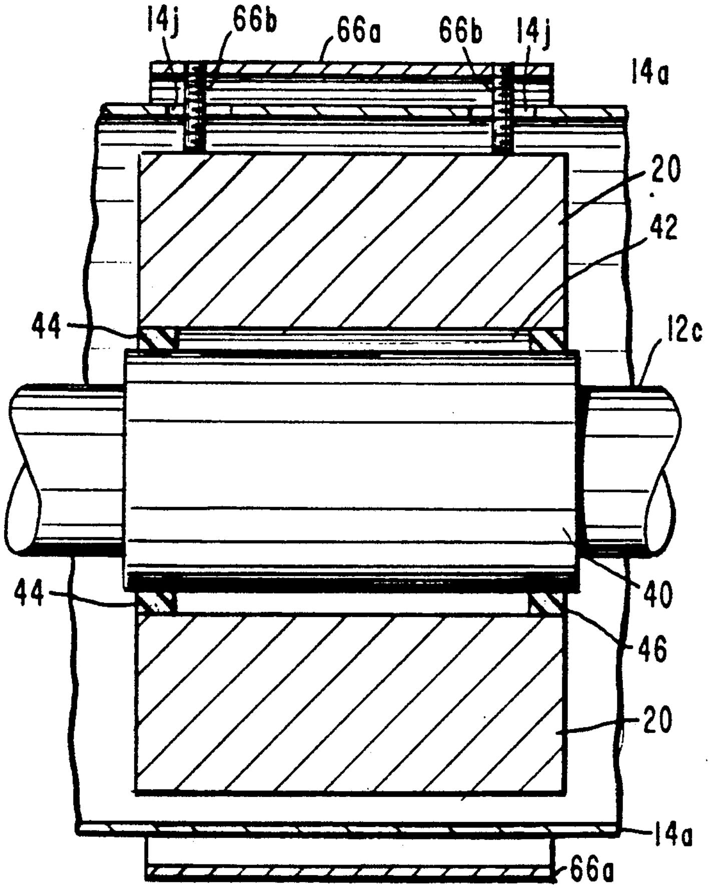
FIG. 10 is a longitudinal sectional view illustrating how the focus tube is clamped by the positioner inside a metal shield.
Figure 11:
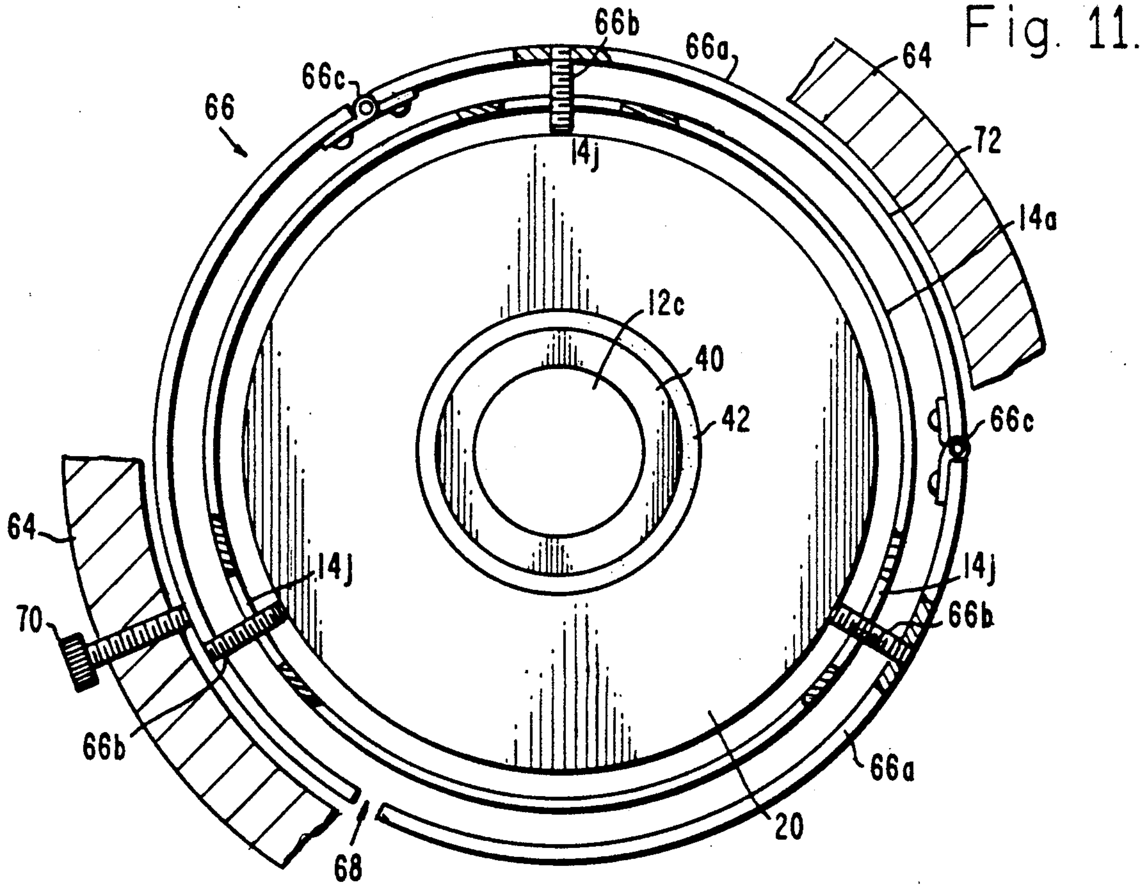
FIG. 11 is a transverse sectional view of the arrangement illustrated in FIG. 10.

With reference also being made to FIGS. 10 and 11, openings 14*j* are formed through the front shield section 14*a*. The positioner 62 includes a support member in the form of a gimbal ring 64, which movably supports the focus coil 20 inside the front section 14*a* through the openings 14*j*. To accomplish this purpose, the present invention provides a clamping assembly which includes a clam shell 66, having three arcuate sections 66*a* and two posts or pins 66*b* extending radially inwardly from each section 66*a*. The center section 66*a* is pivotally connected at its ends to the other two sections 66*a* by hinges 66*c*. The clam shell 66 may be closed to firmly clamp the focus coil 20 therein as illustrated in FIGS. 10 and 11, or opened to release the coil 20 as viewed in FIG. 9. In the closed, or clamping position, the inner ends of the pins 66*b* clampingly engage the outer surface of the coil 20, and a space 68 exists between the adjacent free ends of the outer sections 66*a* which are hinged to the center section 66*a*. A tightening screw 70 is radially threaded through the gimbal ring 64. In the tightened or clamping position, the inner end of the screw 70 engages with the outer surface of one of the sections 66*a*, urging the clam shell 66 closed and into engagement with a radially opposed portion 72 of the inner surface of the gimbal ring 64. The pins 66*b* extend through the openings 14*j* in the shield 14. In this manner, the focus coil 20 is firmly clamped to the gimbal ring 64 by means of the clam shell 66.

To assemble the cathode ray tube 12, front shield section 14*a*, and the focus coil 20 in the positioner 62, the sleeve 40 is first clamped onto the neck 12*c* at the predetermined position. Then, the clam shell 66 is closed loosely around the front shield section 14*a*, with the pins 66*b* extending through the openings 14*j*. This may be performed either by holding the unit constituted by the tube 12 and front section 14*a* in one hand, while clamping the clam shell 66 with the other hand, or by holding the tube 12 and front section 14*a* in a jig (not shown) which frees both of the operator's hands to position the clam shell 66 around the front section 14*a*.

The focus coil 20 is then slid onto the neck 12*c* and sleeve 40 inside the clam shell 66, and the pieces of foam rubber or weatherstripping 44 and 46 are applied. The assembly is then inserted into the gimbal ring 64. The tightening screw 70 is tightened to clamp the clam shell 66 onto the focus coil 20, and thereby clamp the focus coil 20 to the gimbal ring 64 for integral movement therewith. As illustrated in FIGS. 10 and 11, the front shield section 14*a* is coaxially disposed between the gimbal ring 64 and focus coil 20. However, movement of the ring 64, clam shell 66, and focus coil 20 does not result in movement of the tube 12 or front section 14*a*.

The positioner 62 includes a base 74 which supports a pair of upstanding posts 76. A rear plate 78 is slidably supported by the posts 76 for movement in translation along a Y axis 80 as illustrated in FIG. 9. A front plate 82 is slidably supported by the rear plate 78 for movement in translation along an X axis 84. A yoke 86 is mounted on a pin 88 which extends through the front plate 82, and is movable in translation along a Z axis 90. The yoke 86 is also movable in rotation about the pin 88, which is parallel to the Z axis 90, and is thereby capable of movement with two degrees of freedom (translation and rotation relative to the Z axis).

Upper and lower gimbal bearings 92 and 94 are fixed to the upper and lower ends of the yoke 86 respectively, and support the gimbal ring 64 by means of pivot pins which are not visible in the drawing, but extend parallel to the Y axis 80. This enables the gimbal ring 64 to rotate about the Y axis 80. Thus, the gimbal ring 64 and thereby the clam shell 66 and focus coil 20 are capable of movement with five degrees of freedom: translation along the X, Y, and Z axes, and rotation about the Y and Z axes. Although not shown, micrometer screws or the like are provided to adjustably and precisely move the gimbal ring 64 in each of the five degrees of freedom individually.

The tube 12 and front shield section 14*a* are supported on the base 74 of the positioner 62 by means of upstanding support members 96 and 98. The stigmator 34 and centering magnet coils 36 are mounted on the neck 12*c*. As described above, the rear shield section 14*b* may be attached to the assembly during the alignment procedure, or the alignment may be performed with the rear section 14*b* detached.

Electrical test pattern signals are applied to the tube 12 from a test unit 100. The stigmator 34 and centering magnet coils 36 are adjusted through slots (not shown) in the rear shield section 14*b*. The focus coil 20 is aligned to the cathode ray tube 12 by moving the gimbal ring 64 and thereby the coil 20 through at least one of its degrees of movement using the micrometer screws, as required by the particular alignment procedure, while observing the test pattern on the screen 12*b*. When the test pattern results in a perfectly centered and shaped spot on the screen 12*b*, the epoxy adhesive 42 is injected into the space 48 defined between the outer surface of the sleeve 40, inner surface of the focus coil 20, and the pieces of weatherstripping 44 and 46. This fixes the coil 20 onto the sleeve 40, and thereby onto the neck 12*c* of the cathode ray tube 12. Although the focus coil 20 may press against one or both of the pieces of weatherstripping 44 and 46 as it is moved inside the front shield section 14*a* during alignment, the pieces 44 and 46 are compressible, and transmit minimal force to the tube 12 which would cause movement thereof.

Possible creep of the adhesive 42 during hardening should be taken into account, since it might cause movement of the focus coil 20 relative to the tube 12 and upset the alignment. This effect can be obviated by making slight adjustments in alignment as the adhesive hardens, taking care to perform the adjustments slowly since moving the coil 20 too rapidly with the adhesive 42 in a partially hardened state may cause the tube 12 to crack.

The present invention produces an assembly 10 in which the focus coil 20 is aligned relative to the cathode ray tube 12 with the magnetic field of the coil 20 centered with extreme precision relative to the tube 12, resulting in a sharpness of focus heretofore unobtainable. In addition, the focus coil 20 is aligned with the shield 14 in its operative position, thereby precluding the drawback of the prior art in that alignment with the shield detached may be upset when the shield is subsequently attached. Although the invention has been described as being applied to aligning and removably mounting a focus coil on a cathode ray tube, it is not so limited, and may be applied to alignment and/or mounting of other types of electron beam controlling coils such as stigmator and beam centering coils.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A method of mounting and aligning an electron beam controlling coil around a neck of a cathode ray tube at a predetermined position thereon, comprising the steps of:

(a) attaching a shield around a portion of the tube including the predetermined position on the neck thereof;

(b) adjustably retaining the coil inside the shield around the neck of the tube at the predetermined position while aligning the orientation of the coil relative to the tube; and (c) fixing the coil to the neck of the tube at said aligned orientation.

2. A method as in claim 1, further comprising the step, performed before step (b), of:

(d) fixing a removable sleeve around the neck of the tube at the predetermined position;

step (c) including fixing the coil to the sleeve such that the coil and sleeve are removably fixed to the neck of the tube.

3. A method as in claim 2, in which step (c) comprises fixing the coil to the sleeve by means of an adhesive.

4. A method as in claim 3, in which step (c) comprises injecting the adhesive into a space provided between the coil and sleeve.

5. A method as in claim 2, in which step (d) comprises the substeps of:

(e) providing the sleeve as including an inner sleeve member having an inner diameter substantially equal to an outer diameter of the neck of the tube, and releasable locking member means movable into and out of locking engagement with the neck of the tube; and an outer sleeve member fittable over the inner sleeve member and having engaging means movable into and out of engagement with the locking member means upon movement of the outer sleeve member relative to the inner sleeve member in first and second directions respectively;

(f) fitting the outer sleeve member onto the inner sleeve member with the engaging means out of engagement with the locking member means;

(g) positioning the sleeve around the neck of the tube at the predetermined position; and (h) moving the outer sleeve member relative to the inner sleeve member in the first direction such that the engaging means engages with the locking member means, thereby moving the locking member means into locking engagement with the neck of the tube and releasably fixing the sleeve thereto.

6. A method as in claim 5, in which step (e) comprises providing the locking member means as including at least one tapered, resilient finger, and providing the engaging means as including a tapered inner portion of the outer sleeve member for urging said at least one resilient finger inwardly into locking engagement with the neck of the tube upon movement of the outer sleeve member relative to the inner sleeve member in the first direction.

7. A method as in claim 1, in which the shield has at least one opening formed therethrough, step (b) comprising providing an adjustable positioning means around the shield and clamping means for clamping the coil to the positioning means through said at least one opening.

8. A method as in claim 7, in which step (b) comprises the substeps of:

(e) providing the positioning means as including a support member for generally coaxially surrounding the shield, the support member being movable with at least one degree of freedom for aligning the orientation of the coil relative to the tube;

(f) providing the clamping means as including a clam shell having a plurality of arcuate segments which are hinged together at ends thereof and have pins extending radially inwardly for clamping engagement with the coil, the clam shell being generally coaxially disposed between the shield and support member with the pins extending through said at least one opening; and (g) providing the positioning means as further including means for clamping the clam shell to the support member.

9. A method as in claim 8, in which step (g) comprises providing said means for clamping the clam shell to the support member as including a screw which extends radially inwardly from the support member for clamping the clam shell between an inner end of the screw and a radially opposed portion of an inner surface of the support member.

10. A method as in claim 1, in which step (a) comprises injecting an adhesive into a space provided between the tube and shield.

11. A method as in claim 1, further comprising the step, performed after step (c), of:

(d) fixing the coil to the shield using an adhesive.

12. A method as in claim 1, in which the coil is a focus coil.

13. A method as in claim 1, in which step (b) comprises providing positioning means for adjustably retaining the coil for movement with at least one degree of freedom.

14. A method as in claim 1, in which step (b) comprises providing positioning means for adjustably retaining the coil for movement with five degrees of freedom.

15. A sleeve for releasably fixing an electron beam controlling coil around a neck of a cathode ray tube, comprising:

an inner sleeve member having an inner diameter substantially equal to an outer diameter of the neck, and releasable locking member means movable into and out of locking engagement with the neck;

an outer sleeve member fittable over the inner sleeve member and having an outer diameter smaller than an inner diameter of the coil, and engaging means movable into and out of locking engagement with the locking member means upon movement of the outer sleeve member relative to the inner sleeve member in first and second directions respectively.

16. A sleeve as in claim 15, further comprising fixing means for fixing the coil to the outer sleeve member.

17. A sleeve as in claim 16, in which the fixing means comprises an adhesive.

18. A sleeve as in claim 15, in which:

the locking member means comprises a plurality of tapered, resilient fingers; and the engaging means comprises a tapered inner portion shaped to urge the resilient fingers inwardly into locking engagement with the neck upon movement of the outer sleeve member relative to the inner sleeve member in the first direction.

19. An apparatus for adjustably retaining an electron beam controlling coil around a neck of a cathode ray tube inside a shield having at least one opening formed therethrough while aligning the orientation of the coil relative to the tube, comprising:

adjustable positioning means disposed around the shield; and clamping means for clamping the coil to the positioning means through said at least one opening.

20. An apparatus as in claim 19, in which:

the positioning means includes a support member for generally coaxially surrounding the shield;

the clamping means includes a clam shell having a plurality of arcuate segments which are hinged together at ends thereof and have pins extending radially inwardly for clamping engagement with the coil, the clam shell being generally coaxially disposed between the shield and support member with the pins extending through said least one opening; and means for clamping the clam shell to the support member.

21. An apparatus as in claim 20, in which said means for clamping the clam shell to the support member includes a screw which extends radially inwardly from the support member for clamping the clam shell between an inner end of the screw and a radially opposed portion of an inner surface of the support member.

* * * * *